United States Patent
Vignoles et al.

(10) Patent No.: US 7,543,334 B2
(45) Date of Patent: Jun. 2, 2009

(54) UPDATE STATUS ALERTING FOR A MALWARE SCANNER

(75) Inventors: James Malcolm Vignoles, Aylesbury (GB); Barrett Tuttle, Aylesbury (GB)

(73) Assignee: McAfee, Inc., Santa Clara, CA (US)

( * ) Notice: Subject to any disclaimer, the term of this patent is extended or adjusted under 35 U.S.C. 154(b) by 865 days.

(21) Appl. No.: 09/938,489

(22) Filed: Aug. 27, 2001

(65) Prior Publication Data

US 2003/0041259 A1   Feb. 27, 2003

(51) Int. Cl.
*G06F 11/00* (2006.01)
*G06F 12/16* (2006.01)
*G08B 23/00* (2006.01)

(52) U.S. Cl. ............................ 726/24; 726/22; 714/38
(58) Field of Classification Search .................. 713/200; 714/38; 726/24, 22
See application file for complete search history.

(56) References Cited

U.S. PATENT DOCUMENTS

| | | | | |
|---|---|---|---|---|
| 4,788,637 A | * | 11/1988 | Tamaru | 709/221 |
| 5,502,815 A | * | 3/1996 | Cozza | 714/38 |
| 5,764,992 A | * | 6/1998 | Kullick et al. | 717/170 |
| 5,948,104 A | * | 9/1999 | Gluck et al. | 713/200 |
| 6,094,731 A | * | 7/2000 | Waldin et al. | 714/38 |
| 2002/0194487 A1 | * | 12/2002 | Grupe | 713/200 |
| 2002/0199116 A1 | * | 12/2002 | Hoene et al. | 713/201 |

* cited by examiner

*Primary Examiner*—Emmanuel L Moise
*Assistant Examiner*—Michael Pyzocha
(74) *Attorney, Agent, or Firm*—Zilka-Kotab, PC

(57) ABSTRACT

Update status field information (34) is associated with a computer file (32) indicating the update status of a scanner (30, 40, 42, 44) that has previously scanned that computer file. A current scanner encountering that computer file again may examine the update status field information to determine if they match, if the update status field information does not match, then this indicates that one of the scanners concerned is out-of-date and an appropriate alert message relating to this out-of-date scanner is then generated and issued. The update status field information includes a scanner product identifier, a machine identifier, a scanner engine version identifier and a driver version identifier.

19 Claims, 5 Drawing Sheets

UPDATE STATUS ALERTING FOR A MALWARE SCANNER

BACKGROUND OF THE INVENTION

1. Field of the Invention

This invention relates to the field of data processing systems. More particularly, this invention relates to the alerting of an out-of-date update status of a malware scanner of the type that, for example, scans for computer viruses, Trojans, worms, banned files or e-mails containing banned words.

2. Description of the Prior Art

It is known to provide malware scanners, such as anti-virus scanners, e-mail scanners etc, which serve to protect against what can be the serious damage produced by malware. As an example, an anti-virus scanner may inspect computer files on an on-access basis or an on-demand basis to identify if they contain any known computer viruses or computer files having virus like properties.

As new threats emerge it is important that any malware scanners are updated to contain new malware definition data to enable them to identify new viruses or the like, as well as occasionally having scanner engine updates to enable them to keep up-to-date with new malware threats that are posed. Within an organisation there is a considerable administrative load associated with ensuring that all the computers used by an organisation have the latest versions of the virus or banned word definition data and/or the scanning engine. As an example, each individual desktop PC and laptop computer of an organisation may have anti-virus computer software running upon it that require keeping up-to-date. Even if only a small number of individual computers are not using the latest engine and driver data, the possibility of damage to these computers by newly released threats is significant and harmful to the organisation concerned.

One possibility for addressing this problem would be to have an agent running on each computer with a malware scanner, the agent serving to notify the malware scanner's update status to a central source in order that the update status can be managed and updates made more reliable. However, such an agent continuously running on each computer solely for the purpose of monitoring the update status of the associated malware scanner represents a significant disadvantageous processing overhead.

It is known to provide scanning systems for e-mail, such as Microsoft Virus Scanning API for MS Exchange, that stamp an e-mail with a vendor name and version number of the scanning system in order to enable e-mail systems subsequently handling that same e-mail to determine whether or not a further scan of that e-mail is necessary.

SUMMARY OF THE INVENTION

Viewed from one aspect the present invention provides a computer program product operable to control a computer to issue an alert for an out-of-date update status of a malware scanner, said computer program product comprising:

(i) reading logic operable to read an update status field associated with a computer file to be scanned by a current malware scanner, said update status field being indicative of an update status of a previous malware scanner that has scanned said computer file and associated said update status field with said computer file;

(ii) comparison logic operable to compare said update status of said previous malware scanner with an update status of said current malware scanner; and (iii) alert issuing logic operable if said update status of said current malware scanner does not match said update status of said previous malware scanner to issue an update status alert indicative of an out-of-date update status for whichever one of said current malware scanner and said previous malware scanner has a most out-of-date update status.

The invention provides an update status field that is associated with a computer file and is passed together with that computer file as it moves through a computer system such that the various malware scanners that encounter that computer file may check their update status against that previously recorded in the update status field by a malware scanner that has encountered and scanned that computer file before. Allowing the scanners themselves to pass information between each other regarding their update status enables out-of-date scanners to be identified, whether they be the previous scanner or the current scanner, and an appropriate alert message issued. The alert message could take a variety of forms, such as a message to a user to suggest that they update their scanner, a message to an administrator informing them of the out-of-date status of the scanner encountered, or another form such as a combination of the above or an alert that itself triggers an update.

The update status field could be provided in a variety of different ways. One preferred possibility would be to provide the update status field as part of the file properties associated with a computer file and as normally managed by the operating system. Another preferred alternative would be to provide the update status field within an update status file that was associated together and transmitted with the computer file between malware scanners.

Whilst the computer file and the update status computer file could be handled as separate entities providing they were associated together and passed together between scanners, in particularly preferred embodiments the computer file and the update status file may be formed into a combined file to be treated as a single entity, such as a zipped version of the two files.

As a computer file propagates through a computer system, if a more up-to-date status is encountered within a scanner used on that computer file, then the update status field associated with the computer file is modified to correspond to the most up-to-date scanner status encountered. A database of changes in the update status associated with a computer file may be created and used to track the status changes in a manner that can provide useful information to administrators of the computer system as a whole.

As previously discussed, the invention may be used for different sorts of malware scanners, but it is particularly useful in systems in which the computer file is an e-mail attachment, as such a computer file may rapidly progress between a relatively large number of malware scanners in a computer system and so provide an effective way of identifying out-of-date status scanners within that system. These arrangements also well suited for use with tiered malware scanner systems.

The update status field could include a wide variety of data indicative of the status of a scanner concerned. However, particularly preferred information to include within this field comprises one or more of a malware scanner computer program product identifier, a computer hardware identifier (e.g. identifying a particular computer that is storing and running a scanner with an out-of-date status), a scanner engine program version identifier and a malware definition data version identifier.

The term malware will be generally understood by those in this technical field to refer to a wide variety of undesired forms of computer data, such as computer viruses, Trojans, worms, banned computer programs, e-mails containing banned words etc. Other types of malware are also possible.

Viewed from another aspect the invention provides a method of alerting an out-of-date update status of a malware scanner, said method comprising the steps of:

(i) reading an update status field associated with a computer file to be scanned by a current malware scanner, said update status field being indicative of an update status of a previous malware scanner that has scanned said computer file and associated said update status field with said computer file;

(ii) comparing said update status of said previous malware scanner with an update status of said current malware scanner; and (iii) if said update status of said current malware scanner does not match said update status of said previous malware scanner, then issuing an update status alert indicative of an out-of-date update status for whichever one of said current malware scanner and said previous malware scanner has a most out-of-date update status.

Viewed from a further aspect the invention provides apparatus for issuing an alert for an out-of-date update status of a malware scanner, said apparatus comprising:

(i) a reader operable to read an update status field associated with a computer file to be scanned by a current malware scanner, said update status field being indicative of an update status of a previous malware scanner that has scanned said computer file and associated said update status field with said computer file;

(ii) a comparitor operable to compare said update status of said previous malware scanner with an update status of said current malware scanner; and (iii) an alert issuer operable if said update status of said current malware scanner does not match said update status of said previous malware scanner to issue an update status alert indicative of an out-of-date update status for whichever one of said current malware scanner and said previous malware scanner has a most out-of-date update status.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
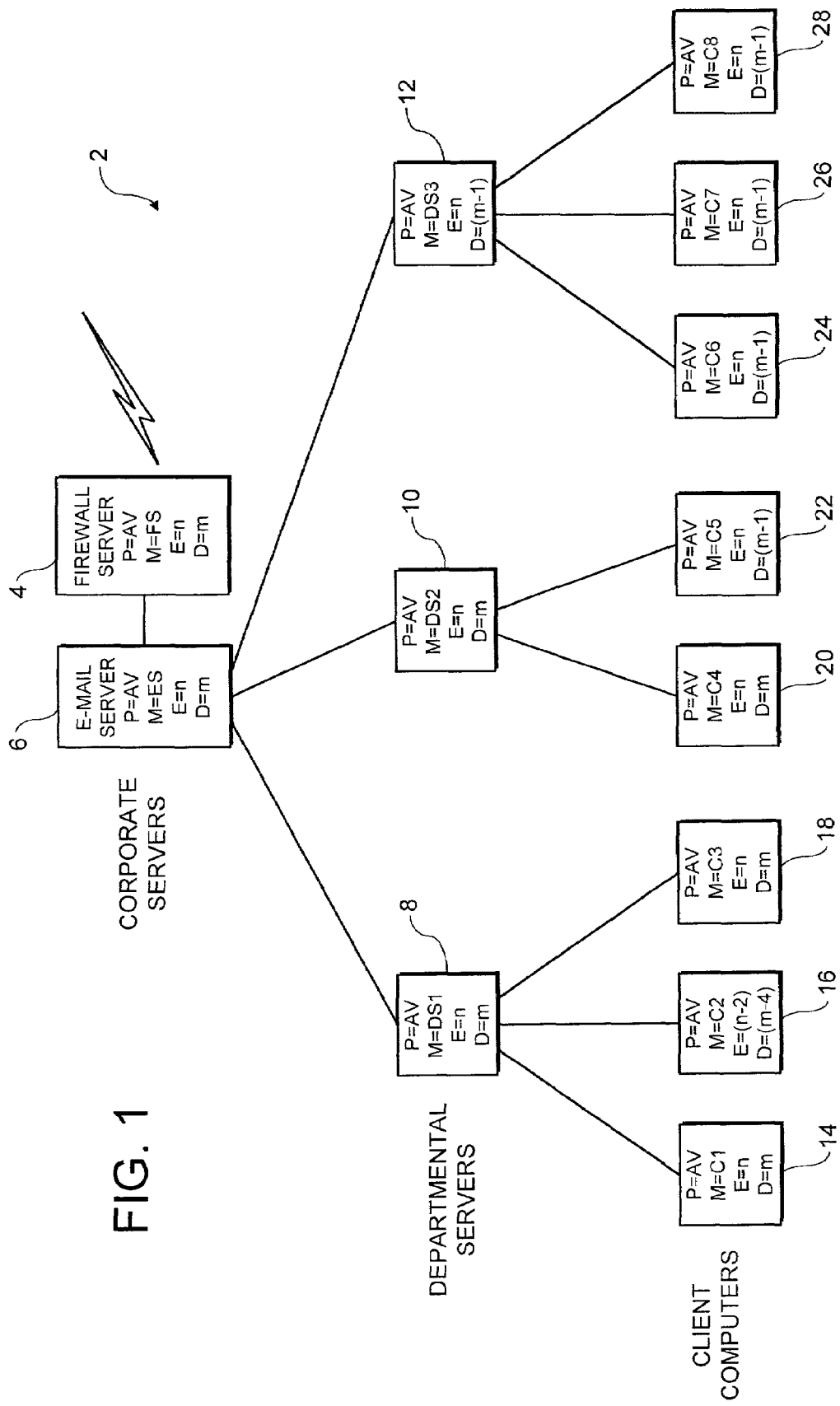
FIG. 1 schematically illustrates a computer system containing a plurality of malware scanners.

FIG. 1 shows a computer system 2 including a fire wall server 4, an e-mail server 6, several departmental servers 8, 10, 12 and a large number of individual user client computers 14, 16, 18, 20, 22, 24, 26 and 28. All of the computers illustrated in FIG. 1 may use anti-virus scanners that share a common basic scanner engine and set of virus definition data. Depending upon the update status of a particular computer, the version of the scanner engine and the virus definition data being used may vary. Typically, the fire wall server 4 and the e-mail server 6 together with the departmental servers 8, 10, 12 will be closely and carefully maintained by the system administrator who will ensure that they are at the most up-to-date status regarding their anti-virus systems.

In the example illustrated, each of the computers has update status information associated with it that specifies the scanner program, P=AV, (an anti-virus program), an identifier of the machine concerned, M=*, (e.g. the fire wall server FS, the e-mail server ES, the first departmental server DS1 or the first client computer C1), the scanner engine version, E=*, being used and the virus definition data version, D=*, being used. In this example the scanner computer program identifier P is the same on each computer, namely identifying that it is the anti-virus computer program that is concerned. Each individual computer then has its own machine identifier. The different computers have their own version data indicating the version of the scanner engine and the virus definition data that they are using. The most up-to-date form of this is using scanner engine 'n' and virus definition data 'm'. The majority of the computers illustrated have this most up-to-date scanner engine and virus definition data. However, the departmental server 12 and all its associated client computers are running with a set of virus definition data that is one set out-of-date, namely "m–1". The individual client computers 22 and 16 also have an out-of-date status. The client computer 22 is one version behind in its virus definition data, namely "m–1". The client computer 16 is seriously out-of-date being two scanner engine versions behind, namely "n–2" and four virus definition data versions behind, namely "m–4". It may well be that the client computer 16 has been dormant for a long period and so has missed several routine scanner updates that have been applied to the other client computers 14, 18 attached to the departmental server 8.

Figure 2:
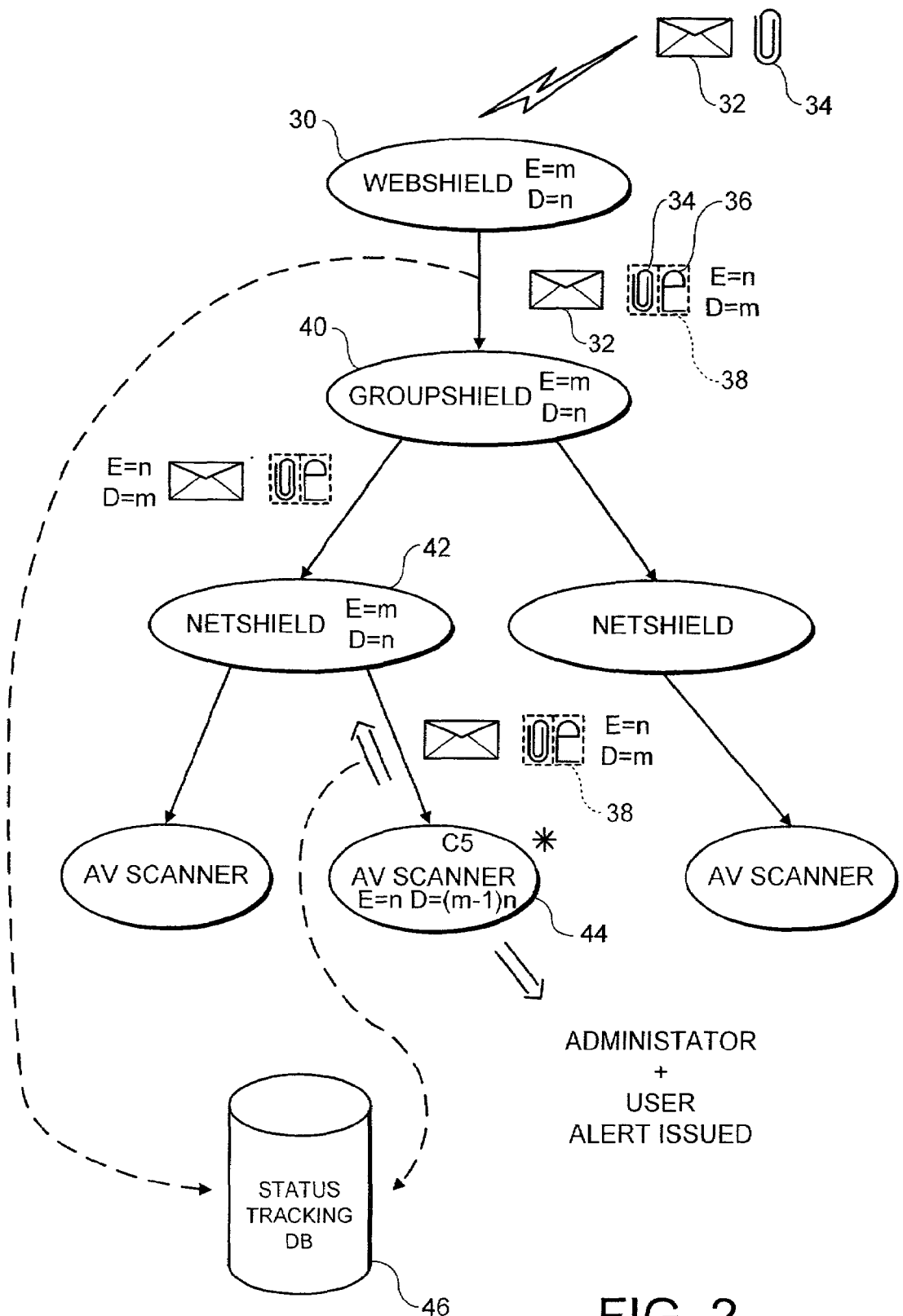
FIG. 2 schematically illustrates a tiered scanner system.

FIG. 2 illustrates another way of considering the malware scanners associated with FIG. 1. In the example illustrated an e-mail 32 is received having an associated attachment computer file 34. The attachment computer file 34 requires scanning for computer viruses. A tiered approach to this scanning is applied.

The fire wall server 4 may run a malware scanner product, such as Webshield provided by Network Associates, Inc. This fire wall scanner 30 checks all the network traffic passing through it to and from the Internet to identify computer files within that traffic that contain computer viruses. The fire wall scanner 30 is using the most up-to-date scanner engine 'm' and the most up-to-date virus definition data 'n'. When the fire wall scanner 30 has scanned and passed the attachment computer file 34 it generates an update status computer file 36 to be associated with the attachment computer file 34 which specifies the product being used, namely an anti-virus computer program, the computer which has applied that product, namely the fire wall server 4, the engine version "m" and the virus definition version "n". The attachment computer file 34 and the update status computer file 36 are then combined together to form a combined file 38, such as being zipped together. This combined file 38 is then associated with the e-mail 32 and passes as a single entity along the distribution chain to its intended recipient.

In this case the e-mail 32 and the combined file 38 pass via the e-mail server 6 that may be running a mail scanner 40, such as Groupshield produced by Network Associates, Inc, the second departmental server 10 running a network scanner 42, such as Netshield produced by Network Associates, Inc, and finally to a client computer 22 running an anti-virus scanner. In the current example, both the e-mail scanner 40 and the network scanner 42 both have the same update status as the fire wall scanner 30, namely engine version 'm' and virus definition data version 'n' and accordingly do not modify the combined file 38. However, the client computer 22 is in this case using a set of virus definition data that is one version out-of-date, namely version "m−1". Accordingly, when the combined file 38 is examined by the anti-virus scanner 44 of the client computer 22, it is identified that the update status associated with the computer file by a previous scanner and that associated with the current scanner do not match. In this instance, and in the majority of cases in a well run network, it is the scanner lower in the tiered hierarchy of scanners 30, 40, 42, 44 that is less up-to-date and accordingly the update status alert message issued to an administrator and the user indicates that the client computer 22 requires an update to its virus definition data. This update might automatically be attempted (such as by an ftp download) in accordance with administrator or user defined preferences.

The example discussed above in relation to FIG. 2 relates to an e-mail message 32 and attachment 34 that originated outside of the computer system 2 and propagated through to the client computer 22. The converse situation in which an email message originates at the client computer 22 and propagates out of the computer system 2 is also possible. In this circumstance, the anti-virus scanner 44 of the client computer 22 would associate status update data with the outbound e-mail message indicating its engine version "n" and its virus definition data version "m−1". When this computer file with this associated update status field information reaches the network scanner 42 at the next level, the difference between the update status field information for the two scanners is detected and the client computer 22 identified as the system having the scanner that requires updating.

A status tracking database 46 may be optionally provided running on a computer of the computer system 2. The particular computer that runs this status tracking database 46 could vary, but may conveniently be one of the departmental servers 8, 10, 12 providing this was accessible to all computers on the network. Whenever a change is made to the update status field information associated with a computer file, this change data (such as the first writing of that data or the changing of that data to indicate the encountering of a more up-to-date scanner) is written to the status tracking database 46. Subsequent examination of the status tracking database 46 allows a system administrator to identify patterns in weaknesses within the update status management of the computer system 2.

Figure 3:
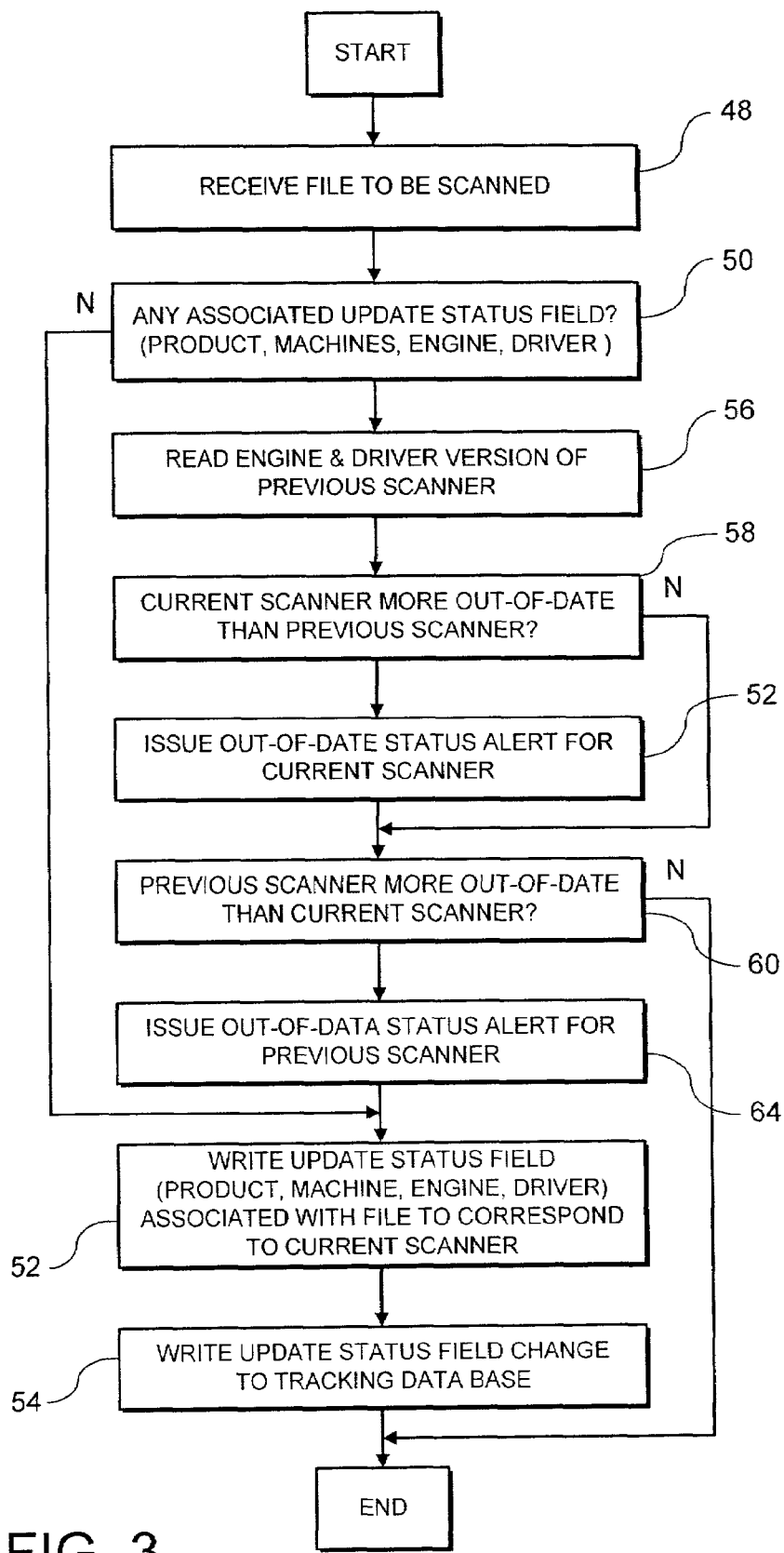
FIG. 3 is a flow diagram illustrating the use of update status data associated with a computer file to check the status of scanners.

FIG. 3 is a flow diagram schematically illustrating the processing performed by a scanner upon receipt of a computer file to be scanned. At step 48 the scanner receives a computer file to be scanned. At step 50 the scanner checks to see if there is any update status field information already associated with that computer file. This update status field information includes an identification of the scanner product concerned, the machine that has previously applied that same scanner product, the scanner engine version and the driver version number associated with that previous scanning. If there is no update status field associated with the computer file received, then processing proceeds to step 52 where this update status field information is generated and associated with the computer file as this is the first scanning of that computer file. Step 54 then writes notification of this change of the update status field information associated with the computer file to the status tracking database 46.

If the test at step 50 indicated that there was update status field information already associated with the computer file received at step 48, then processing proceeds to step 52 at which the engine and driver version numbers of that update status field are read to determine the engine and driver versions previously applied to that computer file. Step 58 then checks whether the current scanner is more out-of-date than the previous scanner. If this is not the case, then processing proceeds to step 60. If this is the case, then step 62 issues an out-of-date status alert for the current scanner being used identifying the current computer running that scanner as being out-of-date. This alert may be issued to either or both of the user and the administrator.

At step 60 a check is made as to whether or not the previous scanner that scanned that file is more out-of-date than the current scanner being used. If this is not the case, then processing terminates. If this is the case, then processing proceeds to step 64 at which an out-of-date status alert is issued relating to that previous scanner as it has now been identified that that previous scanner is out-of-date. It is for the reason of identifying the previous scanner that is out-of-date that the machine identifier is included within the update status field.

Following step 64, processing proceeds to step 52 where the update status field is modified to reflect the information associated with the current scanner as this is now the most up-to-date scanner that has been encountered. Step 54 then notifies this change to the status tracking database 46.

Figure 4:
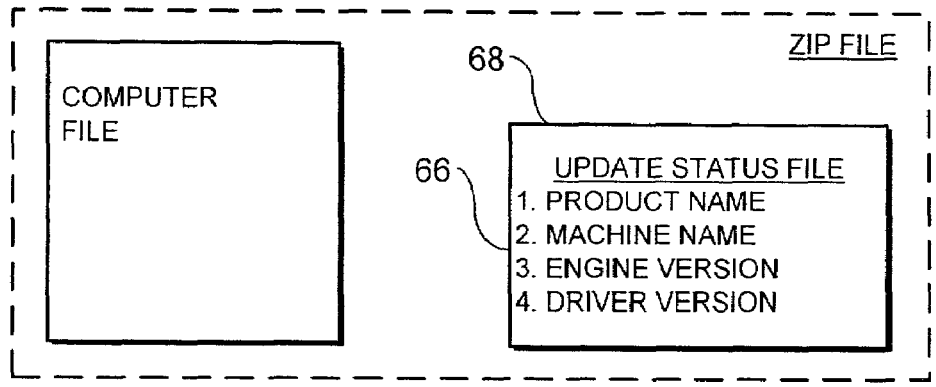
FIGS. 4 and 5 schematically illustrate two different ways in which update status data may be associated with a computer file.

FIG. 4 schematically illustrates one way in which the update status field information 66 may be included within an update status file 68 that is zipped together with the computer file 70 in question to form a combined file 72. This combined file 72 may then be handled further as a single entity with each scanner encountering it serving to extract the two separate files, examine the update status file 68, generate any alerts as necessary, and scan the computer file 70 as necessary. The scanner then passes the combined file 72 on, possibly associating a modified update status file 68 with the computer file 70 and forming a new combined file 72.

Figure 5:
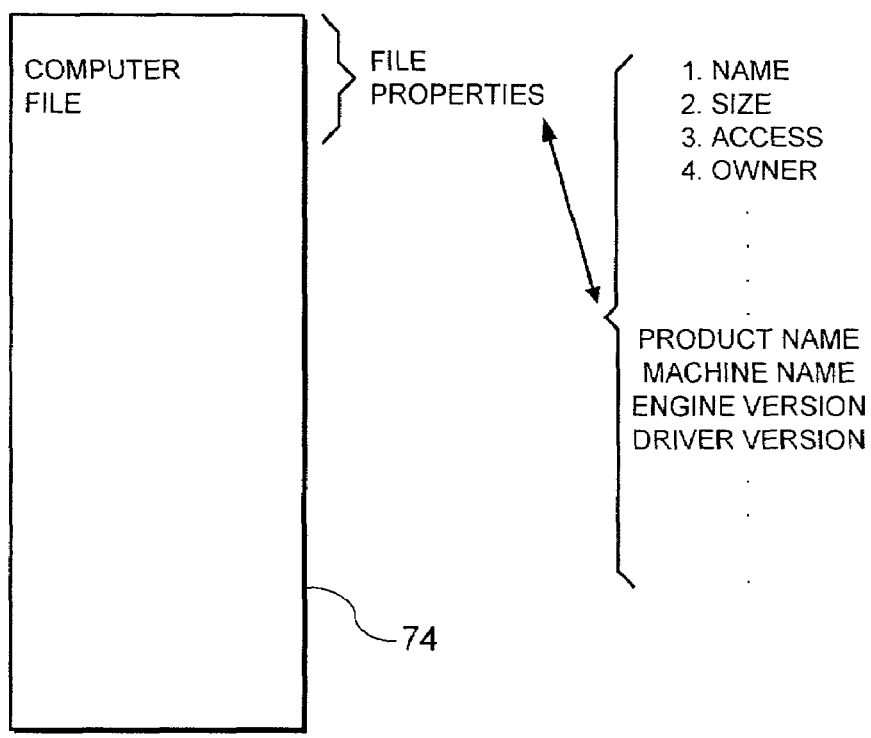

FIG. 5 illustrates a system in which the computer file 74 has associated file properties that are typically accessed and used by the operating system. Examples of such file properties are the file name, the file size, the access types allowed, the owner of the computer file, the creator of the computer file and other administrative details. To this list of file properties it is possible to add update status information relating to any malware scanners used, such as information identifying the product used, the machine that applied that product, the scanner engine version and the driver version. These file properties may be stored physically separate from or together with the computer file to which they relate in accordance with known operating system techniques.

Figure 6:
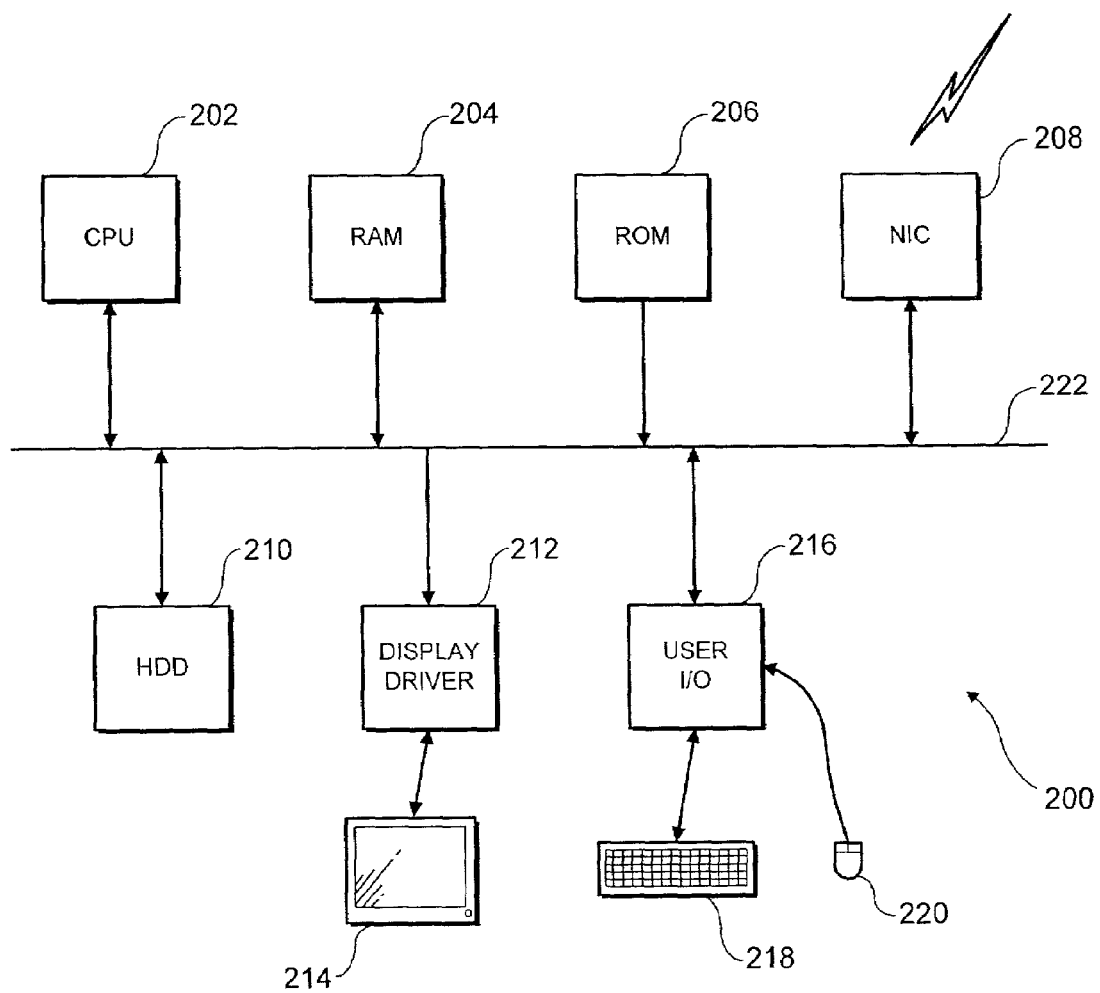
FIG. 6 schematically illustrates a general purpose computer of the type that may be used to implement the above described techniques.

FIG. 6 schematically illustrates a general purpose computer 200 of the type that may be used to implement the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 6 is only one example.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A computer program product embodied on a tangible computer readable medium operable to control a computer to issue an alert for an out-of-date update status of a malware scanner, said computer program product comprising:
   (i) reading logic operable to read an update status field associated with a computer file to be scanned by a current malware scanner, said update status field being indicative of an update status of a previous malware scanner that has scanned said computer file and associated said update status field with said computer file;
   (ii) comparison logic operable to compare said update status of said previous malware scanner with an update status of said current malware scanner;
   (iii) alert issuing logic operable if said update status of said current malware scanner does not match said update status of said previous malware scanner to issue an update status alert indicative of an out-of-date update status for whichever one of said current malware scanner and said previous malware scanner has a most out-of-date update status;
   (iv) change logging logic operable to log changes to said update status field to create a change history in an update status tracking database to enable identification of weaknesses within update status management based on the change history;
   wherein, if said current malware scanner has a less out-of-date update status than said previous malware scanner, then said update status field associated with said computer file is changed to correspond to said current malware scanner;
   wherein said update status alert includes one or more of:
   (i) a user alert issued on whichever one of said current malware scanner and said previous malware scanner has a most out-of-date update status; and
   (ii) an administrator alert issued to an administrator of whichever one of said current malware scanner and said previous malware scanner has a most out-of-date update status;
   wherein, if there is no said update status associated with said computer file at a first malware scanning, then said update status field is generated and associated with said computer file, and said update status tracking database is updated;
   wherein said update status field is included within an update status file passed together and associated with said computer file between malware scanners;
   wherein said update status file and said computer file are combined into a combined file that is passed as a single entity between said malware scanners;
   wherein said combined file is a file compressed combination of said update status file and said computer file.

2. A computer program product as claimed in claim 1, wherein said update status field is included as a property field within said computer file.

3. A computer program product as claimed in claim 1, wherein said computer file is an e-mail attachment.

4. A computer program product as claimed in claim 1, wherein said current malware scanner and said previous malware scanner are part of a tiered malware scanner.

5. A computer program product as claimed in claim 1, wherein said update status field includes one or more of:
   (i) a malware scanner computer program product identifier;
   (ii) a computer hardware identifier;
   (iii) a scanner engine program version identifier; and
   (iv) a malware definition data version identifier.

6. A computer program product as claimed in claim 1, wherein said malware scanner serves to detects one or more of:
   (i) a computer virus;
   (ii) a Trojan computer program;
   (iii) a worm computer program;
   (iv) a banned computer program; and
   (v) banned content within a e-mail.

7. A computer program product as claimed in claim 1, wherein said update status alert triggers an automatic update to said malware scanner in accordance with one of administrator preferences arid user preferences.

8. A computer-implemented method performed with computer code embodied on a tangible computer readable medium, for alerting an out-of-date update status of a malware scanner, said method comprising:
   reading an update status field associated with a computer file to be scanned by a current malware scanner, said update status field being indicative of an update status of a previous malware scanner that has scanned said computer file and associated said update status field with said computer file;
   comparing said update status of said previous malware scanner with an update status of said current malware scanner;
   if said update status of said current malware scanner does not match said update status of said previous malware scanner, then issuing an update status alert indicative of an out-of-date update status for whichever one of said current malware scanner and said previous malware scanner has a most out-of-date update status; and
   logging changes to said update status field to create a change history in an update status tracking database to enable identification of weaknesses within update status management based on the change history;
   wherein, if said current malware scanner has a less out-of-date update status than said previous malware scanner, then said update status field associated with said computer file is changed to correspond to said current malware scanner;
   wherein said update status alert includes one or more of:
   (i) a user alert issued on whichever one of said current malware scanner and said previous malware scanner has a most out-of-date update status; and
   (ii) an administrator alert issued to an administrator of whichever one of said current malware scanner and said previous malware scanner has a most out-of-date update status;
   wherein, if there is no said update status associated with said computer file at a first malware scanning, then said update status field is generated and associated with said computer file, and said update status tacking database is updated;

wherein said update status field is included within an update status file passed together and associated with said computer file between malware scanners;

wherein said update status file and said computer file are combined into a combined file that is passed as a single entity between said malware scanners;

wherein said combined file is a rile compressed combination of said update status file and said computer file.

9. A method as claimed in claim 8, wherein said update status field is included as a property field within said computer file.

10. A method as claimed in claim 8, wherein said computer file is an e-mail attachment.

11. A method as claimed in claim 8, wherein said current malware scanner and said previous malware scanner are part of a tiered malware scanner.

12. A method as claimed in claim 8, wherein said update status field includes one or more of:
   (i) a malware scanner computer program product identifier;
   (ii) a computer hardware identifier;
   (iii) a scanner engine program version identifier; and
   (iv) a malware definition data version identifier.

13. A method as claimed in claim 8, wherein said malware scanner serves to detects one or more of:
   (i) a computer virus;
   (ii) a Trojan computer program;
   (iii) a worm computer program;
   (iv) a banned computer program; and
   (v) banned content within a e-mail.

14. Apparatus including a tangible computer readable medium, said tangible computer readable medium including instructions for controlling a processor to provide a reader, a comparator, an alert issuer, and a change logger, said apparatus comprising:
   (i) said reader operable to read an update status field associated with a computer file to be scanned by a current malware scanner, said update status field being indicative of an update status of a previous malware scanner that has scanned said computer file and associated said update status field with said computer file;
   (ii) said comparator operable to compare said update status of said previous malware scanner with an update status of said current malware scanner;
   (iii) said alert issuer operable if said update status of said current malware scanner does not match said update status of said previous malware scanner to issue an update status alert indicative of an out-of-date update status for whichever one of said current malware scanner and said previous malware scanner has a most out-of-date update status; and
   (iv) said change logger operable to log changes to said update status field to create a change history in an update status tracking database to enable identification of weaknesses within update status management based on the change history;

wherein, if said current malware scanner has a less out-of-date update status than said previous malware scanner, then said update status field associated with said computer file is changed to correspond to said current malware scanner;

wherein said update status alert includes one or more of:
   (i) a user alert issued on whichever one of said current malware scanner and said previous malware scanner has a most out-of-date update status; and
   (ii) an administrator alert issued to an administrator of whichever one of said current malware scanner and said previous malware scanner has a most out-of-date update status;

wherein, if there is no said update status associated with said computer file at a first malware scanning, then said update status field is generated and associated with said computer file, and said update status tracking database is updated;

wherein said update status field is included within an update status file passed together and associated with said computer file between malware scanners;

wherein said update status file and said computer file are combined into a combined file that is passed as a single entity between said malware scanners;

wherein said combined file is a file compressed combination of said update status file and said computer file.

15. Apparatus as claimed in claim 14, wherein said update status field is included as a property field within said computer file.

16. Apparatus as claimed in claim 14, wherein said computer file is an e-mail attachment.

17. Apparatus as claimed in claim 14, wherein said current malware scanner and said previous malware scanner are part of a tiered malware scanner.

18. Apparatus as claimed in claim 14, wherein said update status field includes one or more of:
   (i) a malware scanner computer program product identifier;
   (ii) a computer hardware identifier;
   (iii) a scanner engine program version identifier; and
   (iv) a malware definition data version identifier.

19. Apparatus as claimed in claim 14, wherein said malware scanner serves to detects one or more of:
   (i) a computer virus;
   (ii) a Trojan computer program;
   (iii) a worm computer program;
   (iv) a banned computer program; and
   (v) banned content within a e-mail.

* * * * *